March 22, 1938. B. GRAEMIGER 2,111,663
FEED REGULATOR CONTROL MEANS
Filed June 4, 1935 3 Sheets-Sheet 1
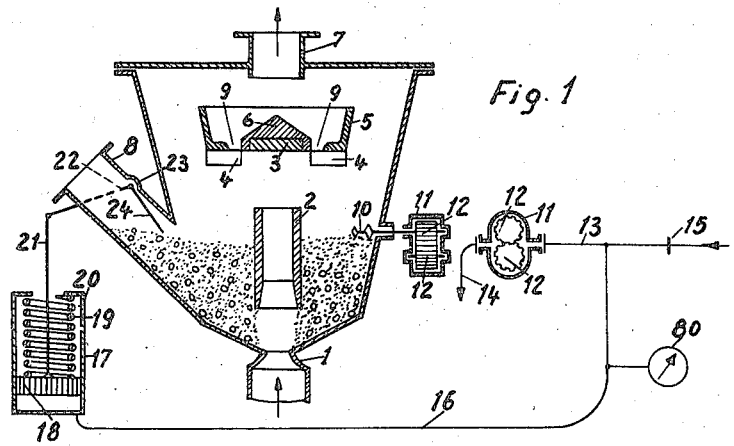
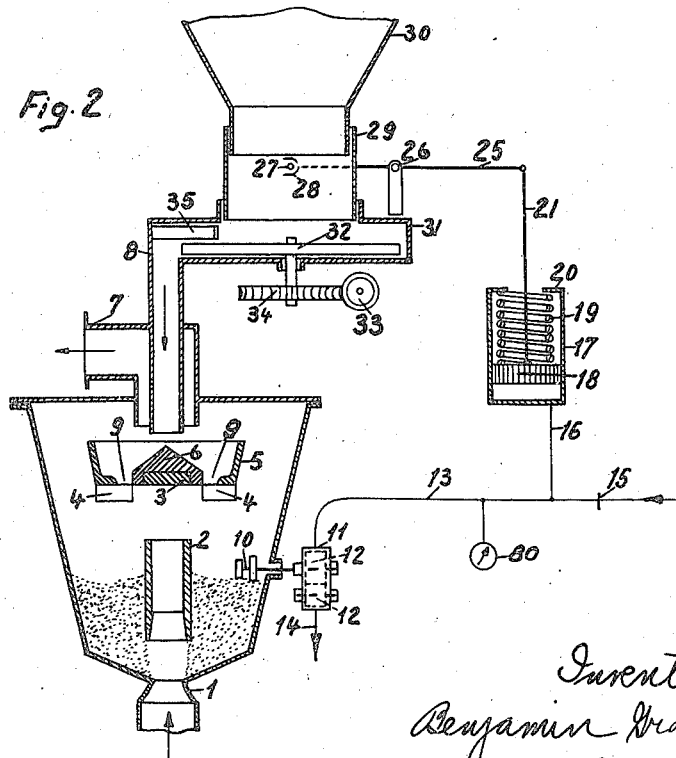
Inventor
Benjamin Graemiger
By B. Singer, Atty.

March 22, 1938. B. GRAEMIGER 2,111,663
FEED REGULATOR CONTROL MEANS
Filed June 4, 1935   3 Sheets-Sheet 2
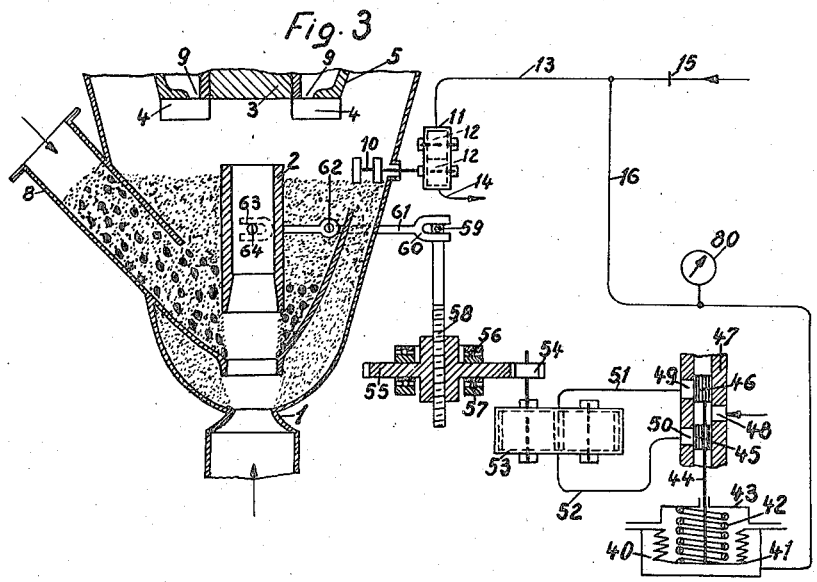
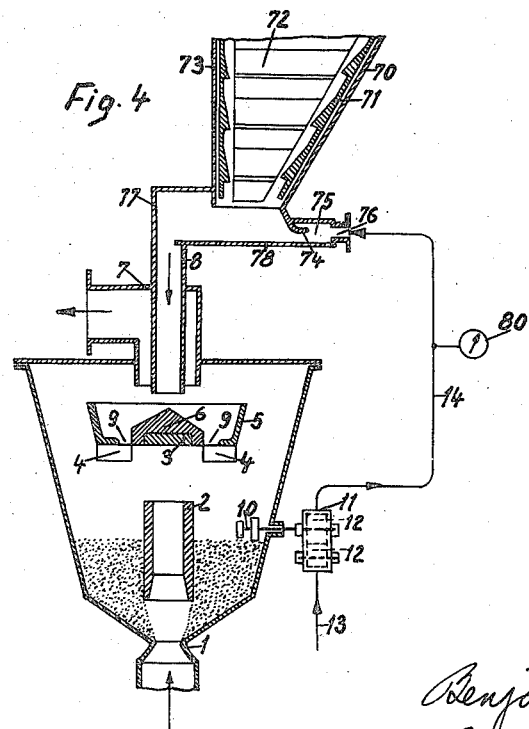
Inventor
Benjamin Graemiger
By B. Singer, Atty.

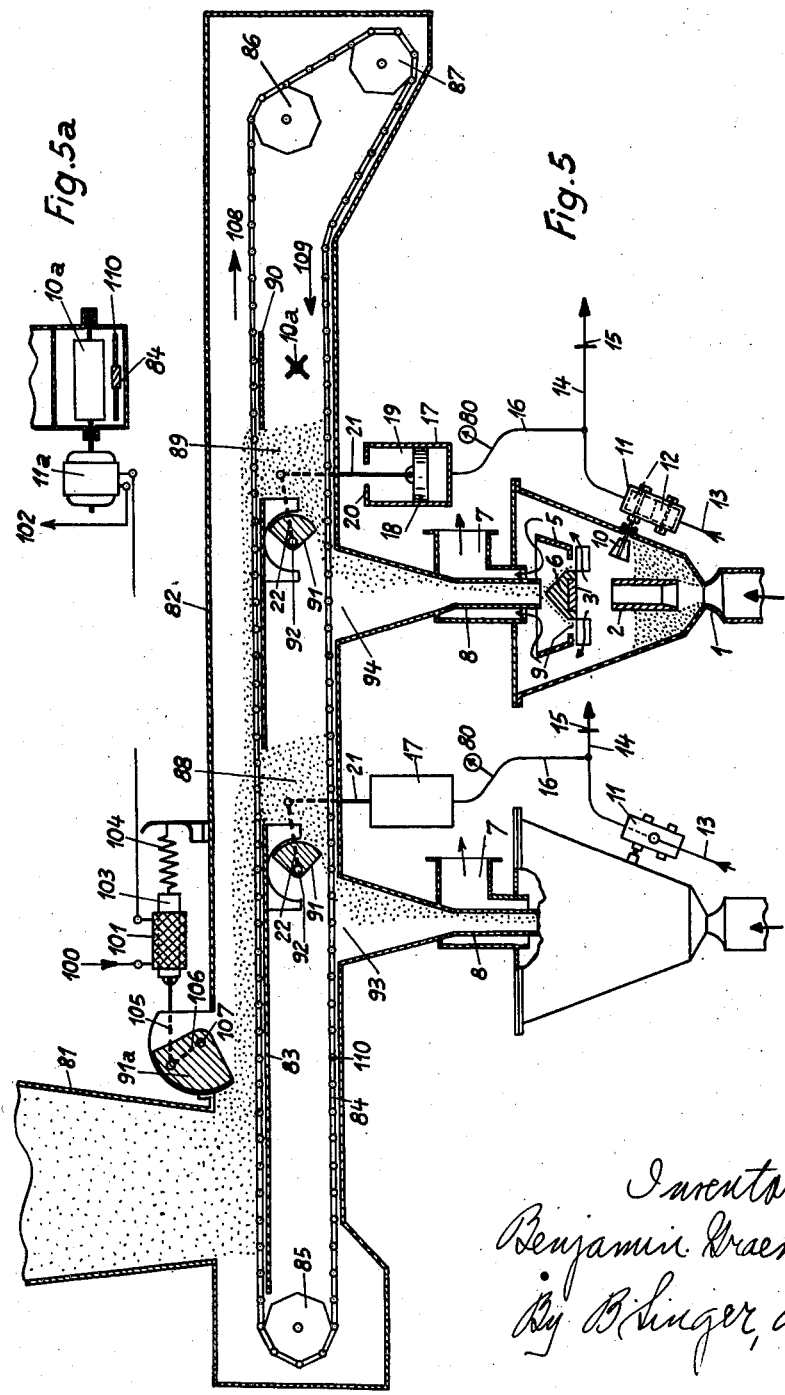

Patented Mar. 22, 1938

2,111,663

UNITED STATES PATENT OFFICE 2,111,663

FEED REGULATOR CONTROL MEANS

Benjamin Graemiger, Zurich, Switzerland

Application June 4, 1935, Serial No. 24,836
In Germany June 11, 1934

4 Claims. (Cl. 83—44)

In solving the problem to control and to signal the level of the charge of material in a container or in an apparatus it is important to create an impulse or to exert energy which is in definite relation to the magnitude of the allowed variations of the level of the charge, but which is sufficiently great to perform the work of signalling and the adjustment of the flow of material adequately and in a reliable manner. The difficulties are especially prominent if the material to be controlled is viscous or granular.

The present invention relates now to a process to perform the said work and to adjust automatically the level of the charge of material within a container by controlling the inflow of the material. The invention consists in that a stream of motive fluid by means of a motor tends to keep a body moving in a zone in which the level of the charge is allowed to play by making use of the reactions or resistance of the said body on the motive fluid to get a signal and to control the outflow of material. The variations of the resistance which the body moved by the motor encounters in the charge vary automatically one or several of the magnitudes of the motive fluid, say its pressure, or its speed and so on. The resistance which the said body encounters is small as long as it moves outside the charge, but it grows rapidly as soon as it is covered partly or wholly by the material. The changes occuring in the motive fluid correspond to the said resistance and such changes are made use of to give signals or to operate any adjusting device for controlling the level of the charges. By such means impulses etc. may be created which exceed in magnitude the variations of the level (by measuring the specific pressure) a hundred times. Any desired relation of the magnitude of the impulse to the position of the level may be attained as the intensity of the braking action on the moving body is a function of the height of the layer of material covering the body being moved by the motor. If a liquid or gaseous motive medium is used a variation of the quantity, preferably a variation of the pressure is contemplated; if electrical energy is used an adjustment of voltage and current is effected. The controlling may be effected by a device for adjusting either the inflow or the outflow or both. The most simple embodiment of the invention is for instance in connection with a liquid container, the use of the inflowing liquid as the motive fluid to drive a motor. If the level of the liquid rises the growing resistance to the above said body brakes the motor, the speed of the motor decreases and correspondingly the amount of inflowing liquid.

The invention may be applied with good results to adjust the feeding of granular material to comminuting devices, especially to impact comminuting devices. Experience shows that the process of automatic controlling and adjusting the rate of flow of very fine and moist material may be executed with the use of very simple devices.

In the accompanying drawings impact comminuting devices are shown by way of examples and in a diagrammatical manner and in connection therewith the process is described in a more detailed manner.

In the drawings:

Fig. 1 is a sectional elevation of an impact comminuting device with a tongue to control the charging of the device.

Fig. 2 is a sectional elevation of an impact comminuting device with a disc feeder.

Fig. 3 is a sectional elevation of an impact comminuting device with an adjustably controlled mixing tube.

Fig. 4 is a sectional elevation of an impact comminuting device with means to control the inflow by pneumatic means.

Fig. 5 is a sectional elevation of an impact comminuting device with a chain feeding device to adjust the rate of flow of the material to the pulverizers.

Fig. 5a is a detail view hereinafter referred to.

All the different figures have in common the following references: 1 denotes the expansion nozzle for the compressed air, 2 the mixing tube, 3 an impact body, 4 the sifting blades, 5 a funnel, 6 a conical body, 7 the outflow socket for the air and the finely comminuted material, 8 the inflow socket or the chute for the inflowing raw material.

The comminuting device works as follows:

The compressed air or gas or vapour expanded in the nozzle 1 engages the material to be comminuted and projects the same through the mixing tube against the impact body 3. The comminuting is attained by impact and by relative friction of the particles. By means of the blades 4 inclined to the radius a rotation is set up which causes the coarse material to flow back to the raw material. A second division is effected in the space between the parts 5 and 6. Material rejected there flows through the slots 9 back into the first sifting chamber. The produced dust passes together with the air through the socket 7. In the device shown in Fig. 3 part of the air jet takes with it mainly rejected material and the other part mainly raw material. In all other devices a mixture of raw material and of rejected material is worked on.

In all the figures 10 denotes a body having a shaft and blades fixed thereon. The body is arranged at or near the level of the charge which is to be maintained. The shaft is connected with a motor 11 driving a pair of toothed gears 12, 12 (Fig. 1 shows the motor in sectional elevation and in a cross section). 13 and 14 denote the conduits for the driving fluid of the motor 11. In Figs. 1 to 3, 15 indicates a throttling device arranged in the conduit 13. 80 denotes a pressure gauge adapted to measure the pressure of the fluid driving the motor 11.

In the device shown in Fig. 1 the pipe 13 is connected with the space below the piston 18 of cylinder 17. The piston 18 is loaded by a spring 19 abutting on a cover 20. To the piston rod 21 a lever 22 is linked which is keyed on a shaft 23. On the said shaft 23 a tongue 24 is fastened. As long as the body 10 is not immersed in the material, its rotation offers no resistance. The motor 11 runs at great speed, it offers no appreciable resistance to the flow of the driving medium (which may be a gas or a liquid). The pressure in the pipe 13 is low, the piston 18 is down and the inflow socket 8 is open. If the level of the material rises resistance is offered to the rotation of the body 10 and the motor 11. The pressure in the pipe 13 raises, the piston 18 is moved upwardly and closes the inflow 8. The pressure gauge 80 indicates the condition within the pulverizer.

In the device shown in Fig. 2 the material is fed to the comminuting apparatus from the bunker 30 by means of a disk feeding device. The said feeding device comprises a casing 31, a disc 32 and a retaining rod 35. The disc 32 is driven by a motor (not shown in the drawings) by means of a worm 33 and a worm wheel 34. Between the outflow of the bunker and the disc feeder a tube 29 is arranged. The tube 29 is provided with pivots 27. A fork 28 engaging said pivots 27 is rotatably mounted at 26. An arm 25 of the fork 28 is linked to the piston rod 21 of the piston 20. The piston 20 works as described with reference to the device shown in Fig. 1. If the level of the material rises above the body 10 an increased resistance is offered to the motor 11, the pressure of the driving medium is increased. The piston 18 moves upwardly and the pipe 29 is moved downwardly. The amount of the material fed to the disc 32 is reduced accordingly.

In the comminuting device illustrated in Fig. 3 the pipe 13 is connected by a pipe 16 to a chamber 40, closed by bellows 41. The bellows 41 are loaded by a spring 42 abutting on a cover 43. A rod 44 is connected with the said bellows and to a piston-slide 45, 46 in the distributing chamber 47. The chamber 47 is provided with an inflow 48 and two outflows 49, 50 of the driving medium. Pipes 51, 52 connect the outflow openings 49, 50 with the motor 53 which may be for instance a toothed gear pump. The motor 53 drives by means of a spur wheel 54 a toothed gear 55, running in ball bearings 56, 57, the boss of which forms a nut for a screw-threaded spindle 58. The spindle 58 is provided with cross pins 59 engaging a fork 60 of a two-armed lever 61 rotatably mounted at 62. The bifurcated end 63 of lever 61 engages cross pins 64 of a mixing tube 2 which is slidably mounted in the device.

The mixing tube 2 is co-axially arranged above the expansion nozzle and is movable in axial direction. If the level of the material within the device rises increased resistance is offered to the motor 11 as described above. The pressure of the driving medium is increased at 15. The bellows 41 are compressed, the piston slide 45, 46 is lifted. The parts 49, 50 are opened and the driving medium passes to the motor 53. The motor 53 shifts the tube 2 downwardly, the flow of raw material to the comminuting device is retarded.

Fig. 4 illustrates an impact comminuting device in connection with a bunker of raw material of which bunker but the lower part 70 is shown. The said bunker is provided with movable wall pieces 71, 72, 73, having projections to facilitate the downward flow of the raw material and to prevent the chocking of the channel. Such auxiliary devices are especially necessary when finely pulverized raw material in a moist condition (moist coal dust) is to be fed. At the lower end of the bunker a nozzle-shaped gap 74 is arranged, the bottom wall 78 forms the tangential continuation of the said gap. A chamber 75 is located in advance of the said gap. The said chamber 75 is connected to the outflow of the motor 11 by a pipe 14: Compressed air is used to drive the motor. While the level of the material within the comminuting device is low a great amount of air flows through the nozzle 74 and a great quantity of raw material is blown into the pipe 8. If the speed of the motor 11 decreases according to the height of the level of raw material less air flows through the nozzle 74 and correspondingly less raw material is fed into the comminuting device. The bottom 78 may be inclined, moreover the wall 77 may be made slanting in such a manner that the material fed cannot adhere on the walls 77, 78 and falls by its own weight. Moreover any suitable material may be used for said walls 77, 78 on which the material cannot adhere. In place of air and of the injection of air directly by the motor 11 as described any other injection device for raw material may be used, which device would have to be controlled in the manner and by the means aforesaid.

It may be pointed out that in the shape and the arrangement of the body 10 there is no restriction the same may be said about the motor 11 and the movement of the body 10 performs. The body 10 may perform for instance a to and fro movement. The means for signalling may be of any known kind, for instance pressure gauges in combination with electrical signalling devices giving acoustic or optical signals. If a liquid or gaseous driving medium is used a valve or the like may be arranged behind the motor 11, and the impulse to act on the signalling and controlling devices may be derived from a point behind the motor. If as a motor 11 an electric motor is used appropriate controlling means are to be used, such as electrical or magnetical auxiliary devices. The motor 11 may be brought in the circuit of an electric motor driving a feeding device for the raw material and the speed of which is being influenced by the speed of the motor 11.

The device shown in Fig. 5 comprises a chain feeding device. The chain feeder comprises a trough 82 which is attached to a bunker 81. The trough 82 is provided with a horizontal wall 83 running over the whole length of the trough. The chain consists of links 84 on which crossrods 110 are fixed. The chain runs over rollers 85, 86, 87. One of the rollers is drivingly connected to a motor not shown in the drawings. The chain runs in the direction of the arrows 108, 109. The chain feeding device is shown in connection with two impact comminuting devices of known construction. The partition wall 83 is provided with two openings 88, 89. The material to be fed to the comminuting device flows through the said openings 88, 89 from the upper part of the trough into the lower part thereof. The lower run of the chain catches the material and moves the same to the openings 93, 94 in the lower part 84 of the trough. The material falls through the said openings into the comminuting device. In front of each of the openings 93, 94 a rotary slide 91 is rotatably mounted on the shaft 92. According to the position of the slide more or less material is fed by the chain to the openings 93, 94. The slides are set by the shaft 92 in dependance to the position of the level of the material in the comminuting device. To the shaft 92 an arm 22 is rigidly fixed which is connected by the link 22 to the piston 18 of a servo-motor constructed and working as described above. The space beneath the piston 18 is connected with the outflow pipe for the motive fluid which drives the motor 11. The throttle 15 is arranged in the outflow 14 and not as described above with reference to the examples shown in Figs. 1 to 4, into the inflow pipe 13. As long as the body 10 finds no resistance by the charge fed into the comminuting device the motor 11 runs rapidly and a great amount of motive fluid passes through said motor. The pressure in the space beneath the piston 18 is high and reacts against the action of the spring 19.

The pressure tends to open the slide 91. If however the body 10 is partly or wholly covered by the material its rotation finds increased resistance. The speed of the motor 11 slows down. The amount of motive fluid passing through the motor decreases. The pressure below the piston 18 decreases accordingly. The slide 91 is now moved in a position to restrict the feed of the material. The arrangement of the throttle 15 in the outflow pipe of the motive fluid has the advantage that in case that the flow of motive fluid ceases, the slide 91 closes entirely. If for instance compressed air is used as a motive fluid and is tapped in front of the nozzle 1, the feed of material ceases entirely as soon as the flow of the compressed air ceases.

If the feeding device feeds material in excess to that flowing to the openings 93, 94 there is left at 89 an excess of material which is fed by the chain and which falls over the edge 90 into the lower part of the trough. That surplus material would fill up the whole lower half of the trough at the right of the opening 94, and finally the upper half of the trough would be filled with surplus material too. The chain would have to pass through the material without feeding the same and the wear of the chain would increase. If the material is of granular and moisty nature the material would stick fast. A regular flow of material from the upper half of the trough into the lower half at 88 and 89 would be quite uncertain. Such a condition is to be obviated and I attain this by the following means:

In the space of the lower half of the trough between the edge 90 and the opening 89 the body 10a is arranged, which is moved by the motor 11a (Fig. 5a). The body 10a is driven by an electric motor. Into the circuit of the motor between the points 100 and 102 a solenoid 101 is arranged. The solenoid is provided with a core 103. The core stands under the action of the spring 104 and is linked to the lever 106. The lever 106 is rigidly fixed to the shaft of the slide 91a. By the slide 91a the material passing from the bunker on to the chain may be controlled. If the material accumulates in the lower half of the trough and comes in the reach of the body 10a the movement of the latter is braked. The current in the circuit of the motor 11a increases. The solenoid attracts the core. The latter moves to the left (Fig. 5a). The slide 91a is moved in such a manner as to close the outflow opening of the bunker 81. On the contrary if less material passes from the bunker 81 on the chain, as may flow through the openings 93, 94 the body 10a will be freed from material. The resistance offered to the rotation of the body 10a diminishes, the current in the circuit decreases correspondingly and also the power of the solenoid. The spring 104 moves now the core to the right and the slide 91 is opened. To drive the body 10a the same or a similar motor as denoted by 11 may be used and therewith a liquid or gaseous motive fluid; in such a case a suitable servo-motor has to be used to operate the slide 91a.

If by the chain feeding device but one comminuting device is to be served, only one slide 91a has to be operated to adjust the amount of material fed. The device 10a is in such a case not needed at all.

The slide 91a is operated by the device 10 according to the level of the charge in the comminuting device.

Chain feeding devices are especially useful in connection with the feed of very fine and of moist material. Such material offers in the usual bunkers great difficulties as the flow of material from the bunker very frequently chocks. The receiving portion of such a chain feeding device according to my invention may be long and the formation of bridges of moist material above the outflow portion of the bunkers may thereby be prevented. The chain feeding devices moreover allow the arrangement of the comminuting device at great distances from the bunker. The chain feeding devices allow the location of the comminuting devices in any convenient place. If the openings 88, 89 and the openings 93, 94 are long enough the failing of the flow of material through the said openings can always be obviated. The chain feeding device allows therefore the feeding of very fine and moist material, or material which offers the very greatest difficulties to feeding by the known devices.

What I claim and wish to secure by U. S. Letters Patent is:—

1. In apparatus of the character stated wherein is provided a container, means to flow material into the container, means to remove material from the container, a body, a fluid actuated motor connected with said body for imparting continuous motion to said body. said body being so positioned in the container that when the level of the material in the container rises above the normal level it will engage said body and thereby apply a braking action to said moving body and said motor, and consequently a variation in the power fluid flowing through said motor is effected, and means utilizing the variation of said power fluid to control the flow of material through the container, said body and its actuating motor being independent of said means to flow and remove material into and from the container.

2. In apparatus of the character stated wherein is provided a container, means to flow material into the container, means to remove material from the container, a body, a fluid actuated motor connected with said body for imparting continuous motion to said body, said body being so positioned in the container that when the level of the material in the container rises above the normal level it will engage said body and thereby apply a braking action to said moving body and said motor, and consequently a variation in the power fluid flowing through said motor is effected, and means utilizing the variation of said power fluid to signal the state of the contents of the container, said body and its actuating motor being independent of said means to flow and remove material into and from the container.

3. In apparatus of the character stated wherein is provided a container, means to flow material into the container, means to remove material from the container, a body, a fluid actuated motor connected with said body for imparting continuous motion to said body, said body being so positioned in the container that when the level of the material in the container rises above the normal level it will engage said body and thereby apply a braking action to said moving body and said motor, and consequently a variation in the power fluid flowing through said motor is effected, means utilizing the variation of said power fluid to control the flow of material through the container and signal the state of the contents of the container, said body and its actuating motor being independent of said means to flow and remove material into and from the container.

4. In apparatus of the character stated wherein is provided a container, means to remove material from the container, a fluid actuated motor, a body driven by said motor located within said container for cooperation with the material therein and governed by the resistance offered to the movements of said body by the material within the container, means for controlling the flow of material through said container governed by the variations of the motor activating fluid of the said motor, and means to signalize the amount of material in the container, said body and its actuating motor being independent of said means to flow and remove material into and from the container.

BENJAMIN GRAEMIGER.